United States Patent [19]

Saleh

[11] 4,353,114

[45] Oct. 5, 1982

[54] DC/DC CONVERTER

[75] Inventor: Mustafa Y. Saleh, Margate, Fla.

[73] Assignee: Siemens Corporation, Iselin, N.J.

[21] Appl. No.: 249,390

[22] Filed: Mar. 30, 1981

[51] Int. Cl.$^3$ ............................................ H02M 3/335
[52] U.S. Cl. ........................................ 363/21; 363/49;
363/97; 323/901
[58] Field of Search ................................... 363/18–26,
363/49, 56, 97; 323/267, 283, 285, 901

[56] References Cited

U.S. PATENT DOCUMENTS 4,266,268   5/1981   Tkacenko ............................. 363/49

OTHER PUBLICATIONS

Regan et al., "Designs for VMOS Push-Pull Converters", *Elec. Engineering*, vol. 52, No. 638, May 1980, pp. 87-96.
Elektronik Magazine, 1978, Issue 14, pp. 72-73.
Texas Instruments Application Report "Designing Switching Voltage Regulators with TL494", *TI Bulletin CA-198*, pp. 1-11.

*Primary Examiner*—William M. Shoop
*Assistant Examiner*—Peter S. Wong
*Attorney, Agent, or Firm*—Karl F. Milde, Jr.

[57] ABSTRACT

A DC/DC converter is disclosed for converting a DC input voltage of one magnitude into at least one DC output voltage of a different magnitude. The converter includes a pulse generator for producing a train of pulses of variable pulse widths, an electronic switch connected to receive the pulses and to switch the input voltage across the primary winding of a transformer, and a rectifier and filter connected to the secondary winding of the transformer for rectifying and filtering the output voltage. Voltage regulation is effected by deriving a signal dependent upon the output voltage(s) and applying the signal fo the pulse generator to vary the pulse widths. The pulse generator receives a supply voltage that is derived from the output voltage. A start-up circuit is provided to supply the pulse generator during an initial power-up period. The DC/DC converter also includes an over-voltage protection circuit, a soft-start circuit and an external clock synchronization circuit.

8 Claims, 3 Drawing Figures

DC/DC CONVERTER

CROSS-REFERENCE TO RELATED APPLICATIONS

This application is related to the following commonly-owned U.S. Patent Applications:

(1) U.S. patent application Ser. No. 249,377 of Theodore Wagner and Donald Gray for "A Transceiver Unit for Use with a Telecommunication System";

(2) U.S. patent application Ser. No. 249,399 of Theodore Wagner, Ramesh M. Vyas and Sam Liang for "Synchronizing Circuit for Use with a Telecommunication System";

(3) U.S. patent application Ser. No. 249,400 of Theodore Wagner, Sam Liang and Deepak R. Muzumdar for "Digital Telephone Apparatus"; and (4) U.S. patent application Ser. No. 249,395 of Deepak R. Muzumdar, George Mierzwa, Richard Sanders and Orrie J. Vander Meiden for "Frame Format For PCM Speech Data in A Telephone Transmission System & Digital Telephone Apparatus for Use with this Frame Format".

BACKGROUND OF THE INVENTION

The present invention relates to a DC/DC converter for converting a DC input voltage of one magnitude into at least one DC output voltage of a different magnitude.

DC/DC converters are known which receive either a regulated or unregulated DC input (supply) voltage and produce one or more regulated DC output voltages of different magnitudes for powering electrical equipment. The purpose of the DC/DC converter is therefore (1) to produce DC voltages of the desired value and (2) to maintain these output voltages substantially constant under conditions of varying loads.

Countless circuits have been designed in the prior art to fulfill these functions. A chief objective in such design is to provide a circuit of sufficient capacity or rated power, at minimum cost.

Whereas, not so long ago, DC/DC converters were constructed of discrete components, integrated circuits are now available which carry out most of the incremental signal (control) functions required therein. Such integrated circuits offer substantial cost reductions in the design of the converter. Two such integrated circuits which operate as pulse generators for driving one or more power transistors are the SG3524 and the TL494.

Applications for the SG3524 are described in *Elektronik Magazine*, 1978, Issue 14; applications for the TL494 are described in a Texas Instruments application report entitled "Designing Switching Voltage Regulators with TL494", TI Bulletin CA-198.

The use of a standard, commercially available integrated circuit to reduce the cost of a DC/DC converter creates certain problems for the circuit designer, however. Since the standard IC is intended for wide commercial application, it does not contain the features necessary to fulfill the circuit requirements in every particular case.

For example, one of the problems encountered in designing a DC/DC converter with an integrated circuit is that the DC input supply voltage is either too high or too low to operate the integrated circuit, or the supply voltage is normally adequate to operate the chip but varies over a wide range which exceeds the limits on $V_{cc}$ prescribed by the integrated circuit manufacturer.

Another problem which arises in the use of an integrated circuit concerns the synchronization of this circuit to an external clock. The integrated circuit incorporates its own internal oscillator which may be timed by connecting an external resistor $R_T$ and an external capacitor $C_T$ to two respective pins on the IC package. There is, however, no convenient way to switch the operation of the integrated circuit from its internal oscillator (operating at the frequency prescribed by the time constant $(R_T C_T)$ to an external oscillator.

SUMMARY OF THE INVENTION

It is a principle object of the present invention to provide a DC/DC converter at minimum cost.

It is another object of the present invention to provide a DC/DC converter which utilizes a pulse generator formed by a standard, commercially available integrated circuit.

It is a further object of the present invention to provide a DC/DC converter in which the pulse generator is powered by an output voltage of the converter.

It is a further object of the present invention to provide a DC/DC converter which may be synchronized to an external clock signal.

These objects, as well as other objects which will become apparent in the discussion that follows are achieved, according to the present invention, by providing a DC/DC converter which comprises a transformer having a primary and at least one secondary winding; a pulse generator for producing a train of pulses of varying pulse widths; an electronic switch connected to receive the train of pulses from the pulse generator and operative to switch an input supply voltage across the primary winding of the transformer; one or more rectifiers and filters, connected to the secondary windings of the transformer, for producing one or more rectified and filtered output voltages of the converter; and a voltage sensor for deriving a signal dependent upon the output voltage(s) of the converter and applying this signal to a control input of the pulse generator so as to maintain the output voltage(s) of the converter substantially constant.

Standard integrated circuits are available to serve as the pulse generator in a DC/DC converter of the type just described. Two such integrated circuits are the SG3524 and the TL494. As noted above, however, the use of such integrated circuits places constraints upon the circuit design which create difficulties for the designer in certain situations.

One such situation is the case where the input supply voltage is either always or sometimes too high or too low to serve as the power supply $V_{cc}$ for the integrated circuit. Another situation is where the frequency and phase of the train of pulses produced by the pulse generator is to be controlled by an external clock. This situation is sometimes encountered where ripple in the output voltage, if not controlled, could have an effect on the equipment powered by the DC/DC converter.

According to the present invention, the integrated circuit of the DC/DC converter is itself powered by one of the output voltages of the converter. In order to permit operation of the converter during an initial power-up period, a circuit is provided to supply input power to the integrated circuit directly from the voltage supply input of the DC/DC converter until output voltages are generated. If this input voltage is too high, it is divided down by a voltage divider or clamped by a zener diode. If this input voltage is too low, it may be converter into voltage spikes which are used to charge a relatively large capacitor to a voltage higher than the input voltage.

The synchronization of the integrated circuit to an external clock signal may be affected by using a resistor $R_T$ and capacitor $C_T$ to provide a pulse period which is slightly greater than the period of the external clock. An electronic switch is then provided, which is responsive to the external clock pulses, for connecting a second resistor in parallel with the resistor $R_T$ in response to the receipt of a clock pulse, thereby to reduce the time constant and synchronize the pulse repetition period of the internal oscillator with that of the external clock.

For a full understanding of the present invention, reference should now be made to the following detailed description of one preferred embodiment of the invention and to the accompanying drawing.

BRIEF DESCRIPTION OF THE DRAWING

The single FIGURE (FIG. 1) is a schematic diagram of a DC/DC converter according to a preferred embodiment of the present invention.

BRIEF DESCRIPTION OF THE PREFERRED EMBODIMENTS

Figure 1A:
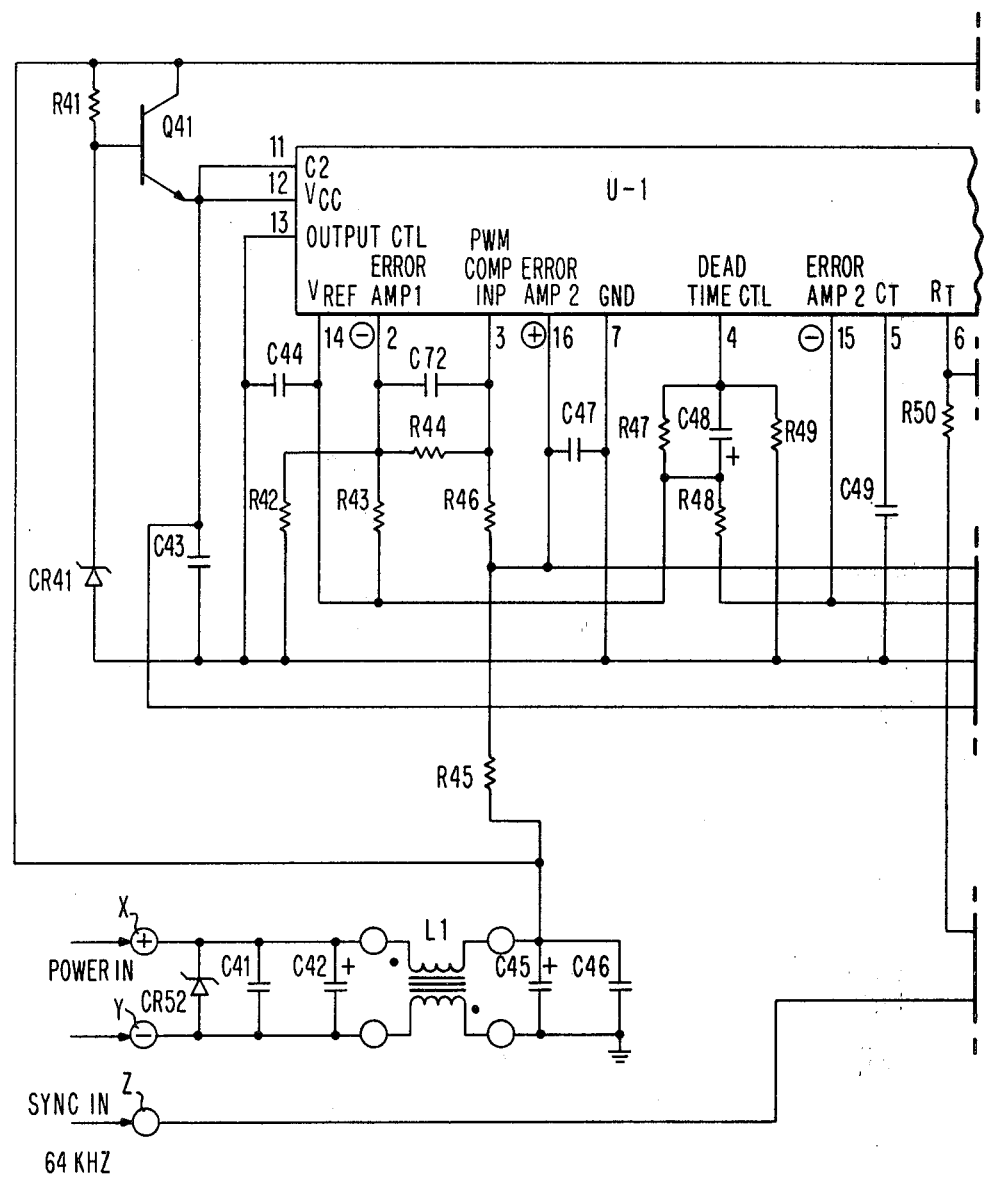
Figure 1B:
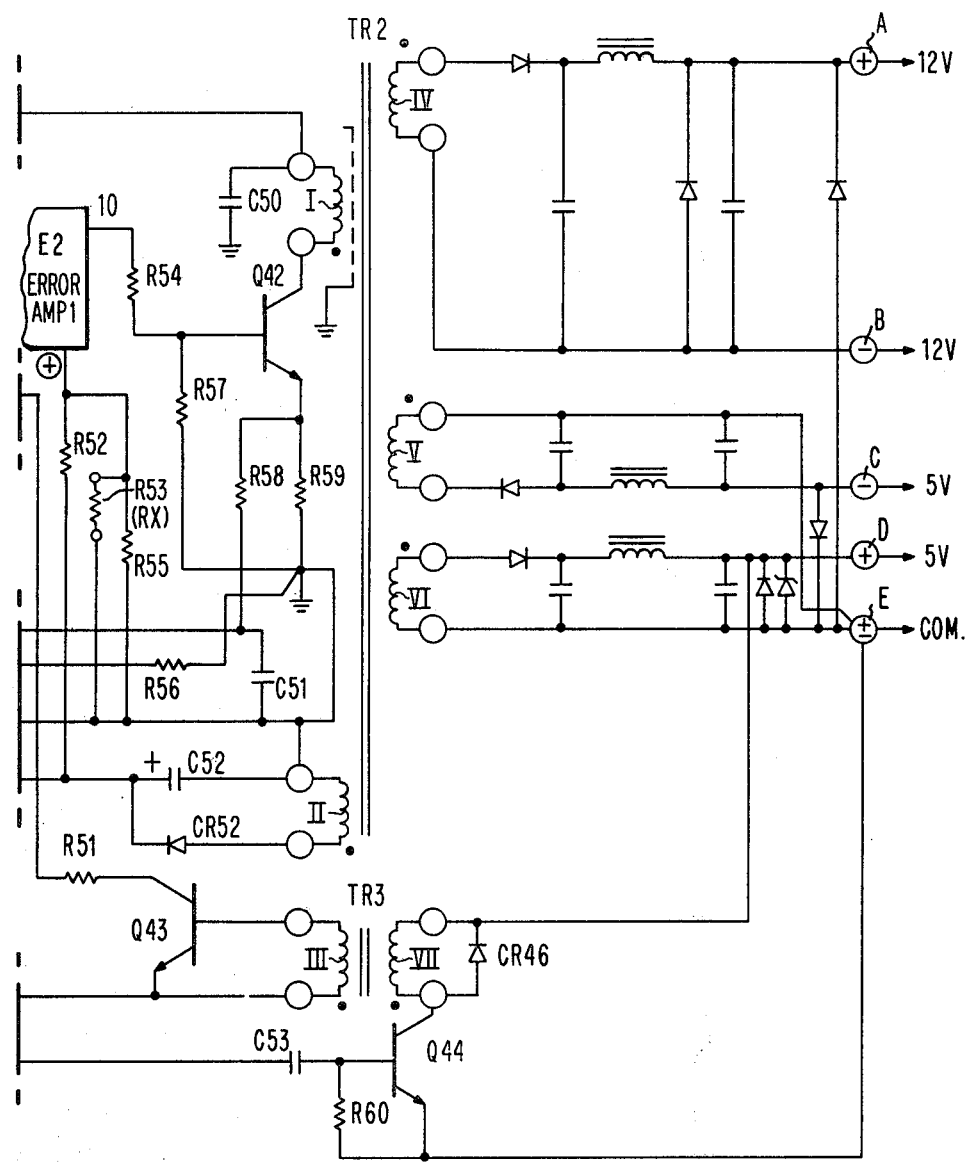

A preferred embodiment of the DC/DC converter according to the present invention will now be described with reference to FIGS. 1A and 1B of the drawings. These drawings, when placed together, form a single figure showing the converter. In this embodiment, the DC/DC converter receives an input supply voltage of approximately 40 volts; however, this voltage may vary over a range of 20–60 volts.

The DC voltage is applied to the DC/DC converter at the input terminals X and Y. The DC to DC converter is isolated from the power supply by a balanced filter comprising the inductance L1 and capacitors C41, C42, C45 and C46. This filter assures a relatively steady voltage at the converter and prevents voltage ripple at the converter from being reflected back to the source. Surges in the input voltage are clipped by a zener diode CR52.

Essentially, the DC/DC converter comprises a monolythic integrated circuit U1 which serves as a source of pulses of constant frequency and variable pulse width. These pulses are applied to the base of a power transistor Q42. The transistor Q42 switches the input voltage applied at the input terminals X and Y across a primary winding I of a transformer TR2, causing interrupted current to flow through this winding. During the period that a pulse is applied to the base of the transistor Q42, the current will increase in the winding I, increasing the magnetic energy stored in the iron of the transformer. When the pulse disappears and the transistor Q42 is switched off, this stored energy is transformed into electrical voltages in the secondary windings, II, IV, V and VI.

These voltages are rectified and filtered by the diodes and capacitors shown, and are applied to the output terminals A, B, C, D and E. The magnitudes of the output voltages depend, of course, upon the respective number of turns in the secondary windings.

The integrated circuit U1 is preferably a TL494 circuit of Texas Instruments, Inc., in Dallas, Texas. A second source for this circuit is Motorola Semiconductor Products, Inc., in Phoenix, Ariz. The TL494 is a fixed-frequency, pulse width modulation control circuit. Modulation of the output pulses is accomplished by comparison of a sawtooth waveform created by an internal oscillator on an external timing capacitor $C_T$, to either of two control signals. The output stage is enabled during that portion of time when the sawtooth voltage is greater than the control signals. As the control signals increase, the period of time the sawtooth input is greater, then decreases. Thus, the output pulse width decreases.

The two control signals in the integrated circuit are derived from several sources: a dead time control and two error amplifiers. The dead time control input is compared directly by a dead time control comparator which has a fixed 100 mV offset. With the dead time control input biased to ground, the output is inhibited during the portion of time that the sawtooth waveform is below 100 mV. This provides a pre-set dead time of approximately 3% which is the minimum dead time that can be programmed. The pulse width modulation comparator in the integrated circuit compares the control signal created by the two error amplifiers. The error amplifiers are used to monitor signals such as the output voltage and current of the DC/DC converter and provide gain such that millivolts of error at their inputs will result in control signals of sufficient amplitude to provide 100% modulation control.

The TL494 also has an internal 5 volt stable reference which is fed to an output pin $V_{ref}$. The pin numbering and the associated pin labels are indicated in FIG. 1. Pins 10 and 11 are the emitter and collector, respectively, of the output transistor used in the DC/DC converter according to the invention.

Whereas the general configuration of the DC/DC converter thus far described is known in the art, the circuit shown in FIG. 1 includes several novel features which support the operation of the converter. These relate to voltage regulation, overload protection, compensation for variations in input voltage, a startup circuit, a soft start circuit and an external clock synchronization circuit.

Voltage regulation is accomplished in the DC/DC converter by providing a reference voltage to one error amplifier input and a load-dependent voltage to the other. In particular, a reference voltage is supplied to the negative input of the error amplifier 1 (pin 2) in U1 and the load-dependent voltage is applied to the positive input of this error amplifier 1 (pin 1). The reference voltage applied to pin 2 is obtained by dividing the $V_{ref}$ generated in U1 with a voltage divider comprising resistors R42 and R43. The resistor values are chosen such that approximately 2 volts are applied to pin 2 from the 5 volt $V_{ref}$. The load-dependent voltage applied to pin 1 is derived from a separate, secondary winding II on the transformer TR2. Any voltage drop at the output, due to increased load, produces a corresponding reduction in the voltage drop across the winding II. The output of this winding is rectified by the diode CR42 and filtered by capacitors C43 and C52. As indicated in FIG. 1, one side of the winding II is grounded.

The filtered voltage is applied to pin 1 of the integrated circuit U1 via a voltage divider comprising resistors R52, R53 and R55. A resistor R53 is arranged in parallel with the resistor R55 and is labeled "$R_x$". This resistor is used to calibrate the DC/DC converter at the factory. Its precise value is determined by monitoring the +5 volt output of the converter under normal load conditions (using a voltmeter, for example) and adjusting the resistance value of $R_x$ until this output is an accurate 5 volts.

With the connections described above, the integrated circuit U1 varies the duty cycle of the pulses applied to the transistor Q42 in such a way that the output voltages of the DC/DC converter remain constant. An increase in load results in a reduction in the voltage applied to pin 1 with respect to that applied to pin 2 of the integrated circuit U1, thus extending the duty cycle of the pulses produced at pin 10 so that more energy is supplied to the transformer TR2 to compensate for the increased load.

If the duty cycle of the pulses applied to the transistor Q42 is increased beyond approximately 65%, however there is a danger that the transistor will "latch up"—that is, remain turned on—because the transistor requires a finite time to itself off. This turn-off time, which is called the "storage time" of the transistor, depends upon its base-emitter capacitance. The charge stored within the transistor in this "capacitor" must first dissipate to switch the transistor off.

Deadtime is required in the present circuit to prevent this occurrence. This deadtime is effected by utilizing the pin 4 in the integrated circuit U1.

As in the case of the voltage regulation, a reference voltage is applied to the negative input of the error amplifier 2 (pin 15) and a pulse width dependent signal is applied to the positive terminal of the error amplifier 2 (pin 16). The reference voltage is obtained by dividing the voltage $V_{ref}$ with a voltage divider comprising resistors R48 and R56. The pulse width dependent signal is derived by filtering the voltage appearing across the emitter resistor R59. This filter comprises the resistor R58 and the capacitors C47 and C51. If this filtered voltage applied to pin 16 of the integrated circuit U1 exceeds the reference voltage on pin 15, then the PWM comparator within the integrated circuit changes state and the output pulse width goes to zero. During the subsequent cycle, of course, the voltage applied to pin 16 will be less than the reference voltage applied to pin 15 so that the maximum pulse will again be produced. As a result, the DC/DC converter will deliver its maximum rated power output in watts, but no more. Additional load placed across the output terminals will result in lowering the voltage produced at the output.

Variations in the voltage received by the DC/DC converter at power input terminals X and Y are compensated by passing this line voltage to pin 16 via a resistor R45. Consequently, the voltage on pin 16 will increase or decrease as the line voltage increases or decreases, respectively, thus varying the tripping point of the overload protection up or down with line voltage.

A start-up circuit is required in the DC/DC converter because the integrated circuit U1 cannot tolerate a supply voltage $V_{cc}$ of more than 42 volts. As noted above, the input power approximately 40 volts, but it is subject to wide swings in voltage. Consequently, the DC/DC converter is designed to generate its own supply voltage for the integrated circuit U1. However, the integrated circuit requires power during an initial start-up period until the converter generates this voltage.

The start-up circuit comprises a resistor R41, a transistor Q41 and a zener diode CR51. Once the converter is operating, the integrated circuit is supplied voltage from the secondary winding II and the rectifier and filter comprising the diode CR42 and the capacitors C43 and C52.

When the power is initially applied to the input terminals X and Y, current flows through the resistor R31 and the zener CR41. The zener diode maintains the base of the transistor Q41 at its breakdown voltage which is 7.5 volts. The transistor Q41 thus conducts and applies voltage to the inputs $V_{cc}$ (pin 12) and C2 (pin 11) of the integrated circuit U1. This input voltage will be maintained at approximately 6.9 volts.

Thereafter, when the DC/DC converter begins to operate, approximately 8 volts is fed back from the circuit comprising the winding II and its rectifier and filter. This 8 volts reverse biases the transistor Q41, turning it off, and supplies the necessary power to the integrated circuit U1. Since the transistor Q41 is merely operated for a brief period during start-up and need not sustain continued use, it may be a relatively low power, inexpensive device.

When the DC/DC converter is initially started up, it will attempt to power equipment which looks like a short circuit. Until the capacitors in the equipment are charged, the load will be large. While the overload protection in the DC/DC converter will activate under this condition, the DC/DC converter according to the invention is provided with an additional circuit, called a "soft start" circuit, so that the duty cycle of the pulses produced by the integrated circuit U1 will initially be small and will then progressively increase to the full value required by the load.

This soft start circuit comprises resistors R47 and R49 and the capacitor C48. During normal operation, the dead time control (pin 4) of the integrated circuit receives a voltage which is divided from the reference voltage $V_{ref}$ by the voltage divider comprising resistors R47 and R49. This dead time control increases the preset "dead time" (100% minus percent duty cycle) from a minimum of 3% to approximately 65%. However, at the time of start up, the capacitor C48 is discharged, shorting the resistor R47, so that pin 4 will see the full voltage produced at the $V_{ref}$ output on pin 14. Consequently, the dead time will be initially larger (approximately 100%) and then will be reduced to the rated dead time (65%) as the capacitor C48 is charged.

Finally, the DC/DC converter is synchronized with an external clock pulse signal applied to the input Z in order to synchronize the output ripple with the operating frequency of the equipment powered by the converter. There are two problems with this external clock synchronization: (1) the integrated circuit U1 does not have an input for operation by an external clock; and (2) in order to generate an external clock signal it is necessary to provide DC power.

Consequently, the DC/DC converter operates solely with the internal clock of the integrated circuit U1 for an initial start-up period and thereafter operates in a mode which is synchronized with the external clock.

The clock synchronization circuit comprises a transformer TR3 having windings III and VII, transistors Q43 and Q44 as well as resistors R51 and R60, capacitor C53 and diode CR64. The clock signal, when it is eventually generated after the equipment driven by the DC/DC converter is powered up, is applied to the base of the transistor Q44. This transistor conducts only when power is applied from the positive 5 volt terminal D and the ground terminal E. Consequently, after start-up, positive and negative pulses are alternately applied to the base of the transistor Q43, thus alternately switching this transistor on and off in synchronism with the external clock. When the transistor Q43 is switched on, the resistor R51 is connected in parallel with the resistor R50.

The frequency and period of the internal clock of the integrated circuit U1 is controlled by the capacitance and resistance connected between ground and the terminal $C_T$ (pin 5) and $R_T$ (pin 6). The pulse period is therefore $R_T C_T$ so that the period may be varied by changing either $R_T$ or $C_T$.

According to the present invention, the time constant $R_T C_T$ is selected (by selecting the values of R50 and C49) so that the natural period of the internal oscillator of the integrated circuit UL is longer than the period of the external clock. Upon receipt of each external clock pulse, the value of $R_T$ is lowered (by connecting the resistor R51 in parallel) so as to shorten the time constant $R_T C_T$. Consequently, on every cycle the internal oscillator sees an initial, relatively large $R_T C_T$ and subsequently, a relatively short $R_T C_T$ with the result that its period corresponds to that of the external clock.

There has thus been shown and described a novel DC/DC converter which fulfills all the objects and advantages sought therefore. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A DC/DC converter for converting an input voltage of one magnitude into at least one output voltage of a different magnitude, said converter comprising, in combination:
   (a) a transformer having a primary winding and at least one secondary winding;
   (b) pulse generator means for producing a train of pulses of variable pulse width, said pulse generator means having a first control input and inputs for a resistor and a capacitor, respectively, said resistor and capacitor defining a time constant for the pulse repetition period of said train of pulses;
   (c) first switch means, connected to said pulse generator means, for switching at least a portion of said input voltage across said primary winding in response to the receipt of said pulses;
   (d) rectifier and filter means, connected to said at least one secondary winding, for producing at least one rectified and filtered first output voltage of a prescribed magnitude that is dependent upon the pulse widths of said pulses;
   (e) first voltage sensor means, connected to said first control input of said pulse generator means, for deriving a signal dependent upon said at least one output voltage and applying said signal to said pulse generator means for varying said pulse widths, thereby to maintain said at least one output voltage substantially constant;
   (f) an external clock input adapted to receive clock pulses from an external source;
   (g) a first resistor connected to said resistor input of said pulse generator means;
   (h) a capacitor connected to said capacitor input of said pulse generator means, said first resistor and said capacitor defining a time constant which is greater than the pulse repetition period of the clock pulses applied to said external clock input; and
   (i) second switch means, coupled to said external clock input, for connecting a second resistor in parallel with said first resistor in response to the receipt of clock pulses from said external clock input, thereby reducing said time constant and synchronizing the pulse repetition period of said pulse generator means with that of the clock pulses applied to said external clock input.

2. The DC/DC converter recited in claim 1, wherein said second switch means is coupled to said external clock input via a second transformer having a primary winding and a secondary winding, said external clock input being connected with amplification to said primary winding thereof.

3. The DC/DC converter recited in claim 1, wherein said pulse generator means includes a second control input and said converter further comprises second voltage sensor means, connected to the second control input of said pulse generator means, for deriving a second signal dependent upon the duty cycle of said train of pulses and applying said second signal to said pulse generator means for varying said pulse widths, thereby to reduce said pulse widths when the total power output of said converter exceeds a prescribed maximum.

4. The DC/DC converter recited in claim 3, further comprising resistor means, connected to said second control input, for passing a portion of said input voltage to said second control input, thereby varying the rated output power of said converter in dependence upon variations in said input voltage.

5. The DC/DC converter recited in claim 1, wherein said pulse generator means further includes a dead time control input and a reference voltage output, and wherein said converter further comprises:
   (j) voltage divider means, connected to said reference voltage output, for applying a prescribed voltage to said dead time control input for establishing a minimum dead time in said pulse train; and
   (k) second start-up circuit means, connected to said voltage divider means, for increasing the voltage applied to said dead time control input during an initial power-up period, thereby lengthening the dead time during this power-up period.

6. The DC/DC converter recited in claim 1, further comprising:
   (l) voltage supply means, connected to said voltage supply input of said pulse generator means, for deriving a supply voltage from said at least one secondary winding and applying said supply voltage to said pulse generator means for powering said pulse generator means; and
   (m) first start-up circuit means, connected to said voltage supply input of said pulse generator means, for supplying at least a portion of said input voltage to said pulse generator means during an initial power-up period until said voltage supply means supplies power from said at least one secondary winding.

7. The DC/DC converter recited in claim 6, wherein means (e) and means (l) comprise a common secondary winding of said transformer and a common rectifier and filter means, connected to said common secondary winding, for producing a rectified and filtered second output voltage, whereby means (e) applies said second output voltage to said control input of said pulse generator means and means (l) applies said second output voltage to said voltage supply input of said pulse generator means.

8. The DC/DC converter recited in claim 7, wherein said common secondary winding is a separate, secondary winding from that to which said rectifier and filter means (d) are connected.

* * * * *